United States Patent [19]

Wei et al.

[11] Patent Number: 4,831,577
[45] Date of Patent: May 16, 1989

[54] DIGITAL MULTIPLIER ARCHITECTURE WITH TRIPLE ARRAY SUMMATION OF PARTIAL PRODUCTS

[75] Inventors: James Y. Wei, Santa Clara; Khosrow Hedayati, San Jose, both of Calif.

[73] Assignee: Intersil, Inc., Santa Clara, Calif.

[21] Appl. No.: 908,489

[22] Filed: Sep. 17, 1986

[51] Int. Cl.[4] .......................... G06F 7/52; G06F 7/50
[52] U.S. Cl. .................................. 364/757; 364/760; 364/784
[58] Field of Search ...................... 364/754, 757–760, 364/768, 784, 786, 787

[56] References Cited

U.S. PATENT DOCUMENTS

| | | | |
|---|---|---|---|
| 3,508,038 | 4/1970 | Goldschmidt et al. | 364/757 |
| 3,675,001 | 7/1972 | Singh | 364/786 |
| 3,866,030 | 2/1975 | Baugh et al. | 235/164 |
| 4,153,938 | 5/1979 | Ghest et al. | 364/760 |
| 4,215,416 | 7/1980 | Muramatsu | 364/736 |
| 4,228,520 | 10/1980 | Letteney et al. | 364/786 |
| 4,293,922 | 10/1981 | Davio et al. | 364/757 |
| 4,432,066 | 2/1984 | Benschop | 364/758 |
| 4,484,301 | 11/1984 | Borgerding et al. | 364/760 |
| 4,545,028 | 10/1985 | Ware | 364/760 |
| 4,575,812 | 3/1986 | Kloker et al. | 364/760 |
| 4,660,165 | 4/1987 | Masumoto | 364/787 |
| 4,679,164 | 7/1987 | Rearick | 364/754 |
| 4,706,211 | 11/1987 | Yamazaki et al. | 364/760 |

OTHER PUBLICATIONS

N. Scott, Computer Number Systems and Arithmetic (1985), pp. 49–51 and 79–83.
Singh, "Multiplier Decoder", *IBM Tech. Disclosure Bulletin* vol. #18 No. 12, pp. 4107–4108, May 1976.

*Primary Examiner*—Gary V. Harkcom
*Assistant Examiner*—Dale M. Shaw
*Attorney, Agent, or Firm*—Henry I. Schanzer

[57] ABSTRACT

The invention performs the multiplication and/or accumulation of digital numbers in either two's complement of unsigned magnitude representation. A modified Booth algorithm minimizes the number of partial products generated. Two adder arrays sum the partial products in parallel to generate intermediate values which are then summed by a third adder array. The partial products are divided between the two adder arrays in a manner which optimizes the speed of the circuit.

13 Claims, 7 Drawing Sheets

```
P0  P1  P2  P3  P4  P5  P6  P7  P8  P9  PA  PB  PC  PD  PE  PF  PG
P00 P01 P02 P03 P04 P05 P06 P07 P08 P09 P0A P0B P0C P0D P0E P0F P0G P0H
    P10 P11 P12 P13 P14 P15 P16 P17 P18 P19 P1A P1B P1C P1D P1E P1F P1G P1H
        P20 P21 P22 P23 P24 P25 P26 P27 P28 P29 P2A P2B P2C P2D P2E P2F P2G P2H
            P30 P31 P32 P33 P34 P35 P36 P37 P38 P39 P3A P3B P3C P3D P3E P3F P3G P3H
                P40 P41 P42 P43 P44 P45 P46 P47 P48 P49 P4A P4B P4C P4D P4E P4F P4G P4H
                            P50 P51 P52 P53 P54 P55 P56 P57 P58 P59 P5A P5B P5C P5D P5E P5F P5G P5H
                            |SET C'|                P60 P61 P62 P63 P64 P65 P66 P67 P68 P69 P6A P6B P6C P6D P6E P6F P6G P6H
                                                        P70 P71 P72 P73 P74 P75 P76 P77 P78 P79 P7A P7B P7C P7D P7E P7F P7G P7H
 SET A                                                           SET B

TC  TC0 TC1 TC2 TC3 TC4 TC5 TC6 TC7
OR0 OR1 OR2 OR3 OR4 OR5 OR6 OR7 OR8 OR9 ORA ORB ORC ORD ORE ORF OR10 OR11 OR12 OR13 OR14 OR15 OR16 OR17 OR18 OR19 OR1A OR1B OR1C OR1D OR1E OR1F ORX0 ORX1 ORX2
TCA
```

Fig. 2

| Fig. 4 | Fig. 5 | Fig. 6 |
|--------|--------|--------|
|        | Fig. 7 | Fig. 8 |

Fig. 3

DIGITAL MULTIPLIER ARCHITECTURE WITH TRIPLE ARRAY SUMMATION OF PARTIAL PRODUCTS

BACKGROUND OF THE INVENTION

The present invention relates in general to digital multipliers and more specifically to improving the speed at which partial products are summed to form the final product of the multiplication.

Binary multiplication is an important function in many digital signal processing applications. Some applications further require accumulation of a product with the results of previous operations (e.g. forming a sum of products). A versatile multiplier circuit must have the capability to perform these functions in either two's complement or unsigned magnitude notation.

Many schemes are known in the art for reducing the time required to perform a binary multiplication. For example, many different encoding methods have been devised which reduce the number of partial products which must be added up to form the final product. The modified Booth algorithm is one of these which is often used in integrated circuit digital multipliers.

Attempts have also been made to speed up the summation of the partial products. In U.S. Pat. No. 4,545,028, issued to Ware, the adder array is divided into blocks so that different blocks can perform different parts of the addition in parallel, even though all of the addition within each block is done in ripple fashion. Furthermore, the first block can only contain four partial products and the remaining blocks must match an arithmetic progression so that carries from one block appear when needed by the next block.

Summation can also be speeded up through use of a carry look-ahead adder. The propagation of carries through a sequential series of adder stages in ripple fashion requires a greater period of time the greater the number of bits in the addends. In a carry look-ahead adder, logic circuitry provides concurrent carry propagation rather than sequential. However, the bit size of a carry look-ahead adder is limited because the circuit complexity, gate count and chip area rapidly increase as bit size increases.

Accordingly, it is a principal object of the present invention to provide a circuit and method for fast, parallel summation of partial products with minimum added complexity and space in an integrated circuit.

It is another object to provide an improved, high-speed adder architecture adapted to provide accumulation and adapted to handle either signed or unsigned notation.

It is yet another object of the invention to provide high-speed binary multiplication with a parallel adder architecture which can be implemented with standard IC technology.

SUMMARY OF THE INVENTION

These and many other objects are achieved in a triple array circuit for adding binary addends. The arrays include a carry save array and first and second carry look-ahead arrays. The carry save array adds a first group of bits of the addends which includes substantially all of the bits of a predetermined number of the least significant or lowest rank addends in order to generate the least significant bits of the final sum and to generate intermediate sum and carry signals. The first carry look-ahead array adds substantially all of the remaining bits of the addends to generate a subtotal. The second carry look-ahead array generates the most significant or remaining bits of the final sum from the subtotal and the intermediate sum and carry signals.

In one aspect of the invention, the triple array circuit is included in a digital multiplier circuit. The digital multiplier also comprises a partial product generating means which generates partial products of different rank in response to a multiplier signal and a multiplicand signal applied to its inputs.

In another aspect of the invention, the sizes of the three arrays and the allocation of the partial product bits are optimized for speed and layout size of the circuit.

BRIEF DESCRIPTION OF THE DRAWINGS

The novel features of the invention are set forth with particularity in the appended claims. The invention itself, as to organization and method of operation, together with further objects and advantages thereof, may best be understood by reference to the following detailed description in conjunction with the accompanying drawings in which:

FIG. 2 shows the grouping of addend bits for an exemplary 16×16 multiplier/accumulator with nine partial products generated using encoding.

FIGS. 3-8 taken together provide a schematic diagram of one embodiment of the triple array architecture corresponding to the multiplier/accumulator of FIG. 2.

DETAILED DESCRIPTION OF THE INVENTION

Figure 1:
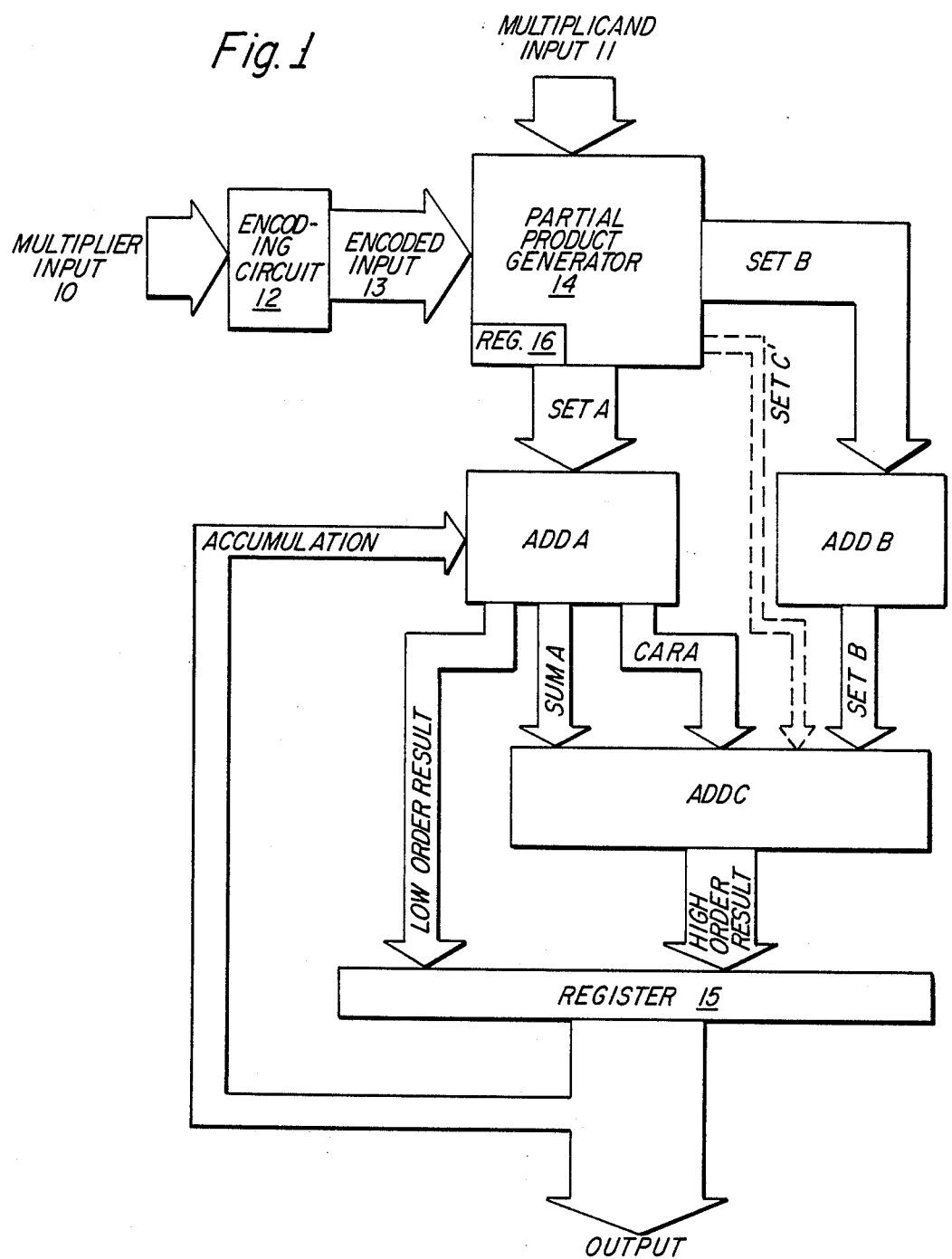
FIG. 1 is a block diagram of one embodiment of a digital multiplier including the triple array summation of the present invention.

Turning now to FIG. 1, a triple array multiplier architecture will be described. The circuit includes a multiplier input 10 and a multiplicand input 11. A multiplier signal at multiplier input 10 is applied to an encoding circuit 12 and is converted to an encoded input 13. Encoding may be performed according to several well known algorithms (e.g. a modified Booth's algorithm) so that the number of partial products generated from encoded input 13 and multiplicand input 11 is less than would otherwise be generated. For example, using a modified Booth algorithm with a multiplier and multiplicand length of 16 bits each, encoded input 13 is encoded into nine terms. As a result, partial product generator 14 would generate 9 partial products to be added to form the final product.

Partial product generator 14 has as its output a plurality of partial products of increasing rank. The bits of the partial products are divided into groups which are summed in a triple adder array. SETA, one group of partial product bits, is input to the ADDA adder array. SETB, another group of partial products bits, is input to the ADDB adder array. A small number of remaining partial product bits SETC' can optionally be provided to the ADDC adder array.

In a preferred embodiment of the invention, SETA includes the bits of the r partial products of lowest order. The value of r is preferably greater than one-half n, where n is the total number of partial products The results of the addition in the ADDA array include a low order portion of the final product, an intermediate sum SUMA and an intermediate carry CARA. The low order result is provided to a register 15 and SUMA and CARA signals are input to the ADDC adder array.

Included in SETB are all or substantially all of the remaining partial product bits. The result of the addition in the ADDB array is SUMB, which is input to the ADDC adder array. There may be a small number of partial product bits which correspond to available adder locations in the ADDC array not being used to add SUMA, CARA and SUMB. These bits may be included in SETC' which bypasses the ADDA and ADDB arrays to be included in the ADDC array. The result of the addition in the ADDC adder array is the high order portion of the final result which is provided to register 15.

According to the triple array architecture of the present invention, high speed and low complexity are achieved by implementing ADDA as a carry save array and ADDB and ADDC as carry look-ahead arrays. Thus, the ADDA array sums the low rank partial products while taking advantage of the low complexity and small chip area of a carry save array. The high speed of the carry look-ahead adder is advantageously employed in the ADDB and ADDC arrays in performing the higher rank summation. More specifically, the ADDA array preferably comprises r-1 rows of carry save adders for adding the partial products in SETA. ADDA may also comprise a row (i.e. a total of r rows) for handling accumulation and two's complement notation. ADDB and ADDC preferably each comprise one or more rows of carry save adders followed by a carry look-ahead adder.

In another aspect of the preferred embodiment, the value of r is selected such that the time delay of carry save addition in ADDA is most closely equal to the time delay of carry look-ahead addition in ADDB. In this way, the architecture is optimized and SUMA, CARA and SUMB will be presented simultaneously to the ADDC array.

The contents of register 15 provide the output of the multiplier. In order to perform accumulation, the contents of register 15 may be fed back into the ADDA array for inclusion in subsequent processing.

In order to handle either signed or unsigned magnitude notation, the multiplicand (at input 11) is extended by two bits and the multiplier (at input 10) is extended by one bit. The value of the extended high order bits depends on the notation used and the value of the most significant bit of the original number. Thus, when signed notation is being used, the value of the most significant bit is repeated in each of the extra bits, e.g. a logical "1" in the MSB position of the multiplicand would be repeated in the two extension bits of input 11. When unsigned notation is being used, each of the extra bits is forced to a logical "0".

In order to also handle two's complement signed notation, partial product generator 14 may also include a two's complement register 16. Register 16 has a plurality of bits, each bit corresponding to a partial product. Each bit can be set in order to indicate that the corresponding partial product in two's complement notation is negative. When performing the addition of the partial products, the contents of register 16 must be added in. Preferably, each two's complement bit is added in the array which includes its respective partial product.

An example of a specific grouping of bits for a triple array multiplier adapted to perform 16 bit by 16 bit multiplication/accumulation using modified Booth algorithm encoding to generate 9 partial products is shown in FIG. 2. The 9 partial products are designated P and P0 to P7. Each designation is followed by a bit designation 0 to H. P is the lowest order or least significant partial product. P7 is the highest order partial product. The least significant bits are designated 0 and the most significant bits by H. FIG. 2 also shows the two's complement bits designated TC and TC0 to TC7. The contents of the accumulator register are designated OR0 to ORX2 and the two's complement bit for the accumulator register is shown as TCA.

The bits in FIG. 2 are arranged such that bits of equal significance are in the same vertical column. Thus, bit significant increases moving towards the right Each two's complement bit has the same significance as the least significant bit of its respective partial product (or the accumulator register in the case of TCA).

As shown in FIG. 2, SETA includes the bits of 6 partial products, namely P and P0 to P4, the accumulator contents OR0 to ORX2 and the corresponding two's complement bits TC, TC0 to TC4 and TCA. SETB includes partial products P6 and P7 and corresponding two's complement bits TC6 and TC7, and includes bits P52 to P5H of partial product P5. Low order bits P50 and P51 and two's complement bit TC5 are grouped into SETC'.

A triple array summation circuit for performing addition according to the groupings of FIG. 2 is shown schematically in FIGS. 4 to 8 with FIG. 3 showing how to arrange FIGS. 4 to 8.

Figure 4:
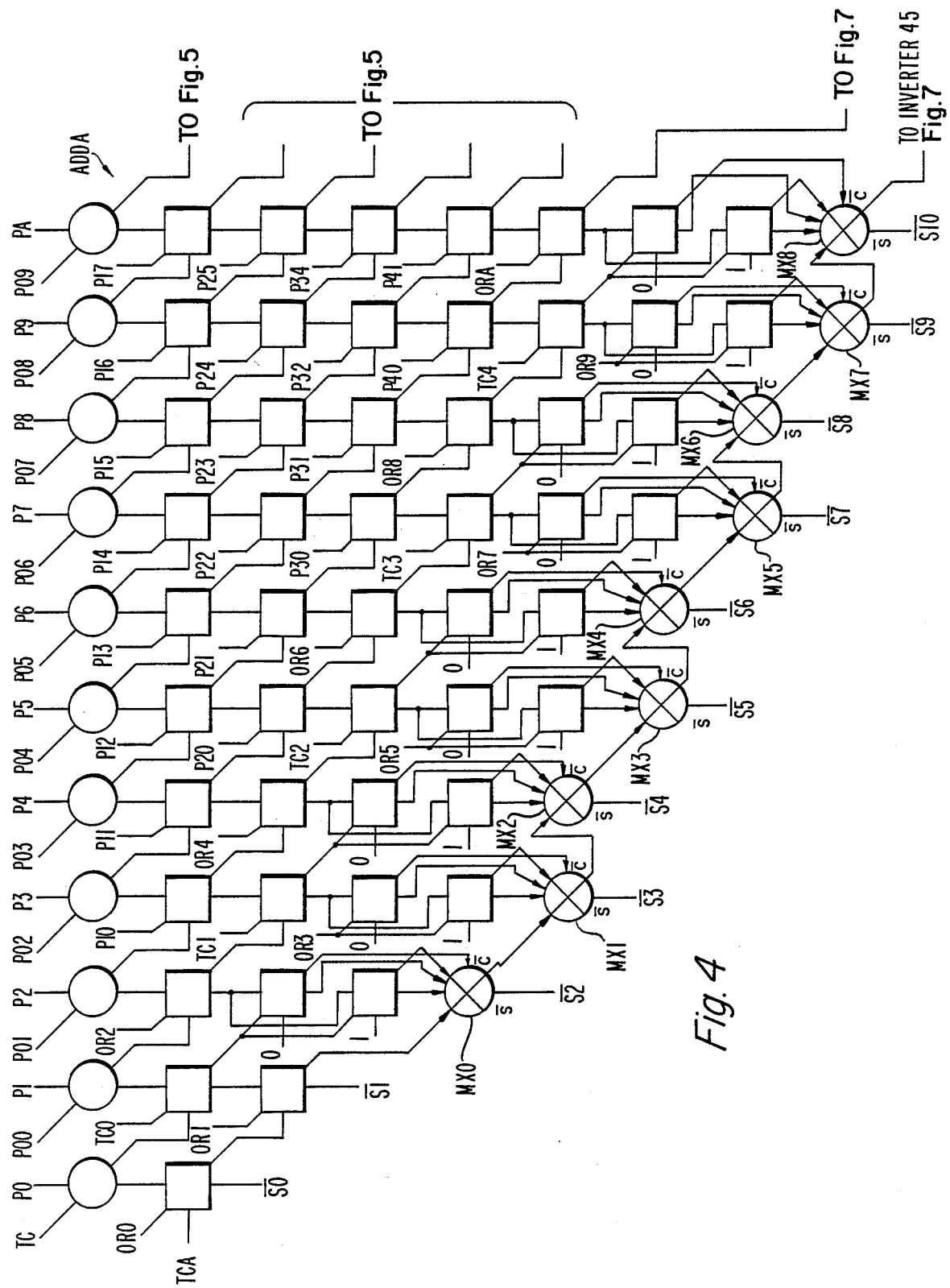
Figure 5:
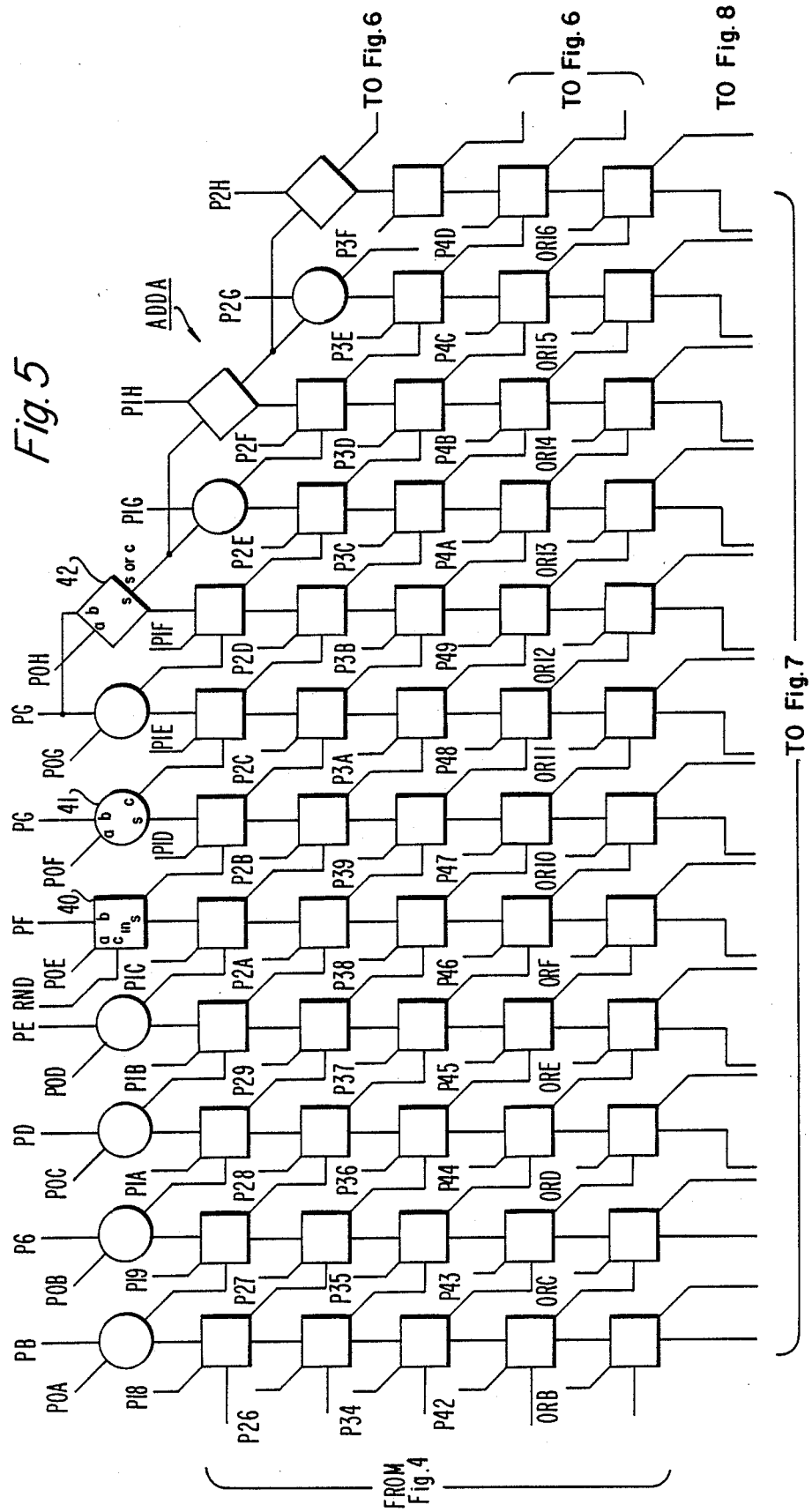
Figure 6:
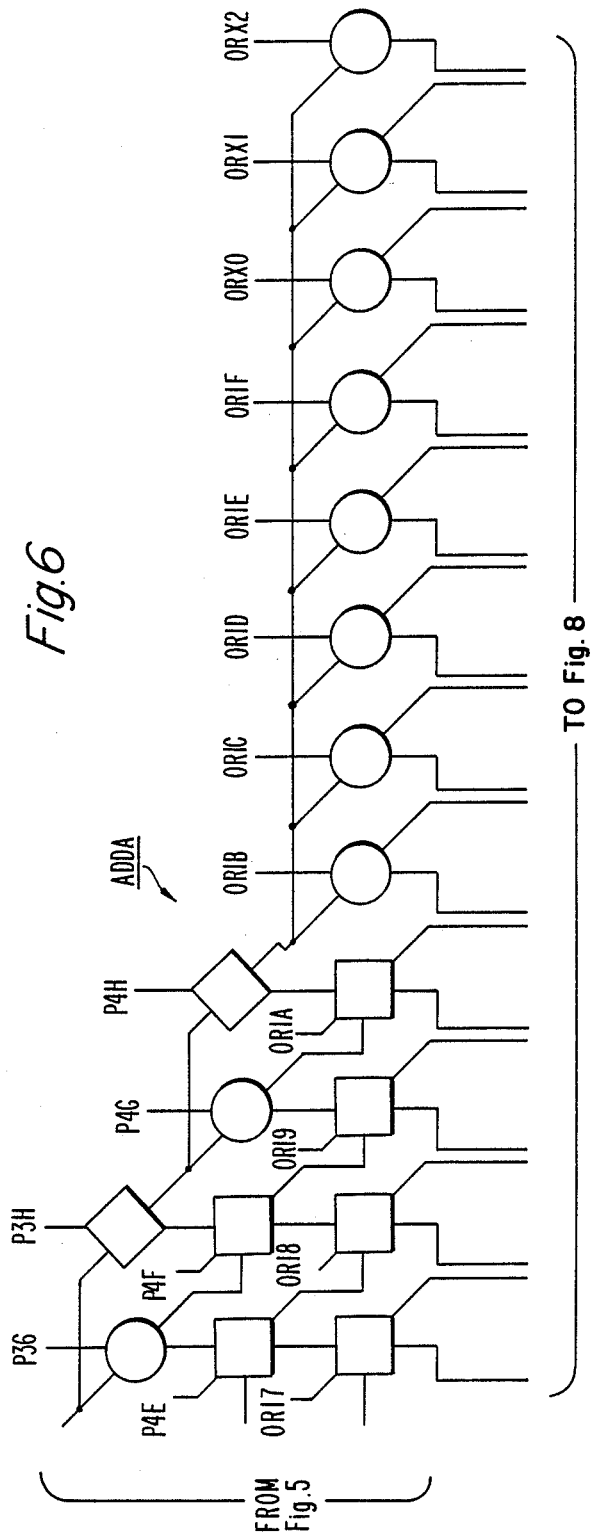

ADDA is a carry save array shown in FIGS. 4 to 6. The first row consists of half adders except in the sixteenth and nineteenth bit positions. A full adder is used in the sixteenth bit position to introduce a round bit RND to cause rounding off of the result when desired. A diamond adder is in the nineteenth bit position of the first row and has bit PG extended to its b input from the previous half adder. The input designations of the full adder, diamond adder and first half adder in the first row are repeated (but not shown) for the other adders of the same types in the figures.

As is known in the art, a full adder (such as full adder 40 in FIG. 5) has addend inputs a and b, a carry input $C_{in}$, a sum output s and a carry output $c_{out}$. A half adder, such as half adder 41, has a and b inputs and s and $c_{out}$ outputs. A diamond adder, such as diamond adder 42, has a and b inputs, an s output and a "s or c" output which is the logical OR of the s and c outputs of a half adder. The bits input to each adder are as shown. Further, some inputs are hard wired to a logical "1" or a logical "0" as indicated.

The ADDA array also includes conditional sum adders MX0 to MX8. These are high speed adders which use a multiplexer to select one of two full adders according to its $C_{in}$ input, as known in the art. The inverted low order bits of the final product are shown to S0 to S10 in FIG. 4.

Figure 7:
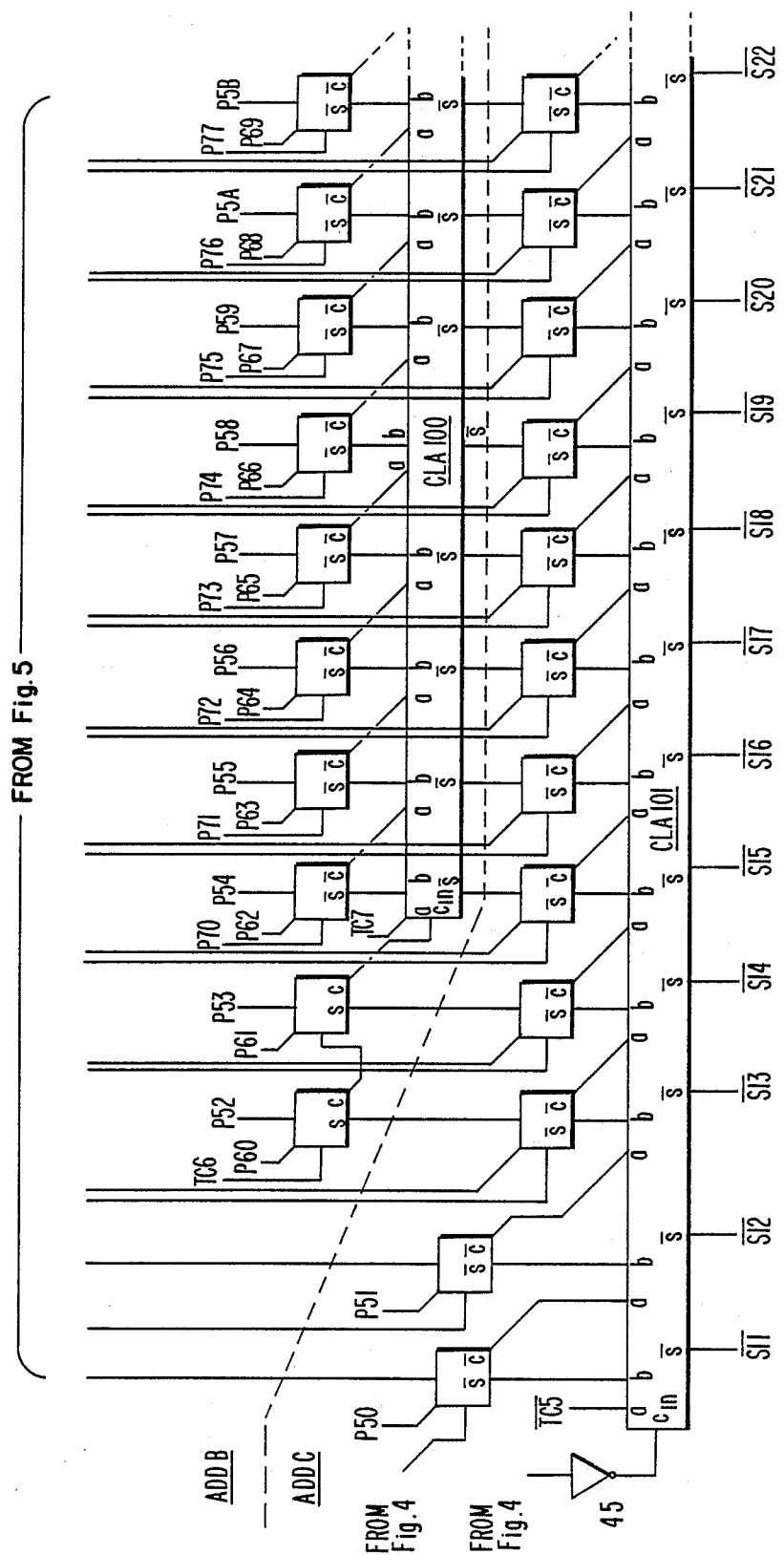
Figure 8:
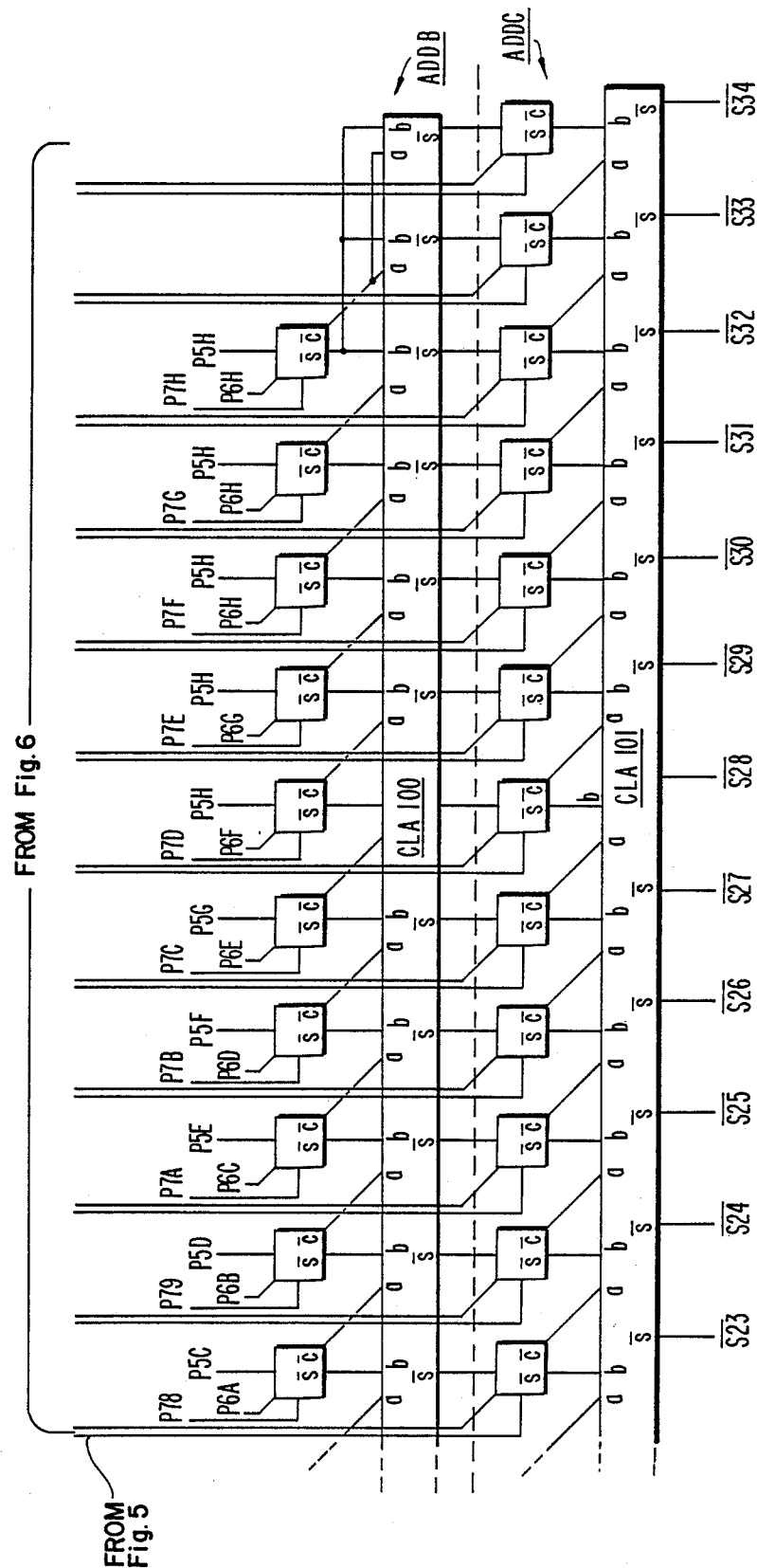

ADDB comprises a row of full adders followed by a 20-bit carry look-ahead adder (CLA) 100, shown in FIGS. 7 and 8. The ADDC array comprises one row of full adders followed by a 24-bit CLA 101. The inverted high order bits of the final product are output from CLA 101 and are shown as S11 to S34. In performing the final addition, the ADDC array receives an intermediate sum signal from the ADDB array and receives both an intermediate sum signal and an intermediate carry signal from the ADDA array.

CLA 100 and CLA 101 are shown with their inputs at the top and outputs at the bottom. The CLAs can be of typical configuration as known in the art and shown, for example, in N. Scott, Computer Number Systems and Arithmetic (1985) and in U.S. Pat. No. 4,153,938, both of which are hereby incorporated by reference.

The foregoing triple array multiplier architecture with parallel summation by a carry save array and a first carry look-ahead array followed by final summation by a second carry look-ahead array achieves high speed, high performance and small chip area in a circuit which can be implemented with standard IC technology. The circuit is versatile, can perform accumulation and can operate with either signed or unsigned magnitude representation.

While preferred embodiments of the present invention are shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A circuit for adding "N" binary addends which are ranked, each addend being comprised of an ordered set of bits, to generate a sum, said circuit comprising:
   a carry save array for adding a first group of "R" addends taken from said "N" addends, said first group of addends including the "R" least significant addends, said carry save array adding the bits of said R least significant addends for generating the least significant bits of said sum and generating a first intermediate sum and carry signals;
   a first carry look-ahead array operating in parallel and simultaneously with said carry save array for adding substantially all of said "N" addends not in said first group of R addends to generate a second intermediate sum; and
   a second carry look-ahead array coupled to said carry save array and to said first carry look-ahead array, said second carry look-ahead array generating the most significant bits of said sum from said first and second intermediate sums and said carry signals; where N and R are integers and N is greater than R.

2. The circuit of claim 1 wherein said number R of least significant addends is at least one-half of the total number of said N addends.

3. The circuit of claim 1 further comprising an accumulator register coupled to said carry save array and said second carry look-ahead array for receiving said sum, said carry save array including means for adding the contents of said accumulator register to said first group of bits in order to perform accumulation.

4. The circuit of claim 1 further comprising a two's complement register coupled to said carry save array and having a plurality of bits, each bit respectively indicating the sign of a respective addend, the contents of said two's complement register being added into said sum.

5. A digital multiplier circuit for producing the sum of a multiplier signal and a multiplicand signal comprising:
   partial product generating means for generating N addends, of different rank, each addend comprising a set of partial products comprised of an ordered set of bits, in response to a multiplier signal and a multiplicand signal applied to the inputs of said partial product generating means;
   a carry save array coupled to said partial product generating means for adding the bits of a first group of R addends taken from said N addends and for generating the least significant bits of said sum and generating intermediate sum and carry signals;
   a first carry look-ahead array operating in parallel and simultaneously with said carry save array coupled to said partial product generating means for adding substantially all of the bits of said N addends not included in said first group to generate an intermediate product; and
   a second carry look-ahead array coupled to said carry save array and to said first carry look-ahead array, said second carry look-ahead array generating the most significant bits of said sum from said intermediate product and from said intermediate sum and carry signals; where N and R are integers with N being greater than R.

6. The multiplier circuit of claim 5 wherein said partial product generating means includes an encoding circuit for encoding said multiplier signal to reduce the number of partial products which are generated.

7. The multiplier circuit of claim 6 wherein said encoding circuit performs a modified Booth algorithm.

8. The multiplier circuit of claim 5 further comprising an accumulator register coupled to said carry save array and said second carry-look ahead array for receiving said sum, said carry save array adapted to add the contents of said accumulator register to said first group of bits in order to perform accumulation.

9. The multiplier circuit of claim 5 further comprising a two's complement register coupled to said carry save array and having a plurality of bits, each bit respectively indicating the sign of a respective partial product, the contents of said two's complement register being added into said sum.

10. The multiplier circuit of claim 5 wherein said first group of R addends is at least one-half of the total number of said N addends and is selected such that said intermediate sum and carry signals and said intermediate product are generated substantially simultaneously.

11. The multiplier circuit of claim 5 wherein said partial product generating means generates nine addends, wherein said first group of addends added by said carry save array includes the bits of the six least significant addends, wherein said first carry look-ahead array comprises one row of full adders and a carry look-ahead adder, and wherein said second carry look-ahead array comprises one row of full adders and a carry look-ahead adder.

12. A method for adding n partial products in a digital multiplier comprising the steps of:
   adding the r least significant partial products of said n partial products in a carry save array to generate the least significant bits of the final sum and to generate intermediate sum and carry signals, the value of r being a whole number greater than one-half n, said carry save array performing said addition in a time delay A;
   simultaneously adding the remaining bits of said n partial products in a carry look-ahead array to generate an intermediate product in a time delay B; and
   adding said intermediate sum and carry signals and said intermediate product to generate the most significant bits of said final sum.

13. The method of claim 12 wherein the value of r is selected to minimize the difference between time delay A and time delay B.

* * * * *